(12) United States Patent
Lei et al.

(10) Patent No.: US 11,652,359 B2
(45) Date of Patent: May 16, 2023

(54) CHARGING DEVICE

(71) Applicant: SHENZHEN CARKU TECHNOLOGY CO., LIMITED, Guangdong (CN)

(72) Inventors: Yun Lei, Guangdong (CN); Mingxing Ouyang, Guangdong (CN); Zhifeng Zhang, Guangdong (CN)

(73) Assignee: SHENZHEN CARKU TECHNOLOGY CO., LIMITED, Shenzhen (CN)

( * ) Notice: Subject to any disclaimer, the term of this patent is extended or adjusted under 35 U.S.C. 154(b) by 0 days.

(21) Appl. No.: 17/528,765

(22) Filed: Nov. 17, 2021

(65) Prior Publication Data

US 2022/0077714 A1    Mar. 10, 2022

Related U.S. Application Data

(63) Continuation of application No. 16/862,242, filed on Apr. 29, 2020, now Pat. No. 11,205,920.

(30) Foreign Application Priority Data

Mar. 11, 2019    (CN) .......................... 201910182347.5

(51) Int. Cl.
*H02J 9/06* (2006.01)
*B60R 16/033* (2006.01)

(52) U.S. Cl.
CPC .............. *H02J 9/06* (2013.01); *B60R 16/033* (2013.01)

(58) Field of Classification Search
CPC ................................ H02J 9/06; B60R 16/033
(Continued)

(56) References Cited

U.S. PATENT DOCUMENTS 7,161,253 B2    1/2007  Sodemann et al.
2014/0138960 A1    5/2014  Huang
(Continued)

FOREIGN PATENT DOCUMENTS

CN    205901352 U    1/2017
CN    107910951 A    4/2018
(Continued)

OTHER PUBLICATIONS

The European Search Report issued in corresponding European Patent Application No. EP20171066, dated Aug. 17, 2020, European Patent Office, Munich, Germany.
(Continued)

*Primary Examiner* — Michael R. Fin
(74) *Attorney, Agent, or Firm* — Hauptman Ham, LLP

(57) ABSTRACT

The present disclosure discloses a charging device, which comprises an energy storage module, an output interface, a switch module and a control module. The energy storage module is configured to store and provide electrical energy. The output interface is configured to be electrically coupled to a load, wherein the energy storage module is configured to output electrical energy to the load through a discharge circuit. The output interface is electrically coupled in the discharge circuit. The switch module is electrically coupled in the discharge circuit. The control module is configured to detect a current of the discharge circuit, and turn off the switch module when the current of the discharge circuit is greater than a preset current, to switch off an electrical connection between the energy storage module and the output interface.

20 Claims, 5 Drawing Sheets

(58) Field of Classification Search
USPC ........................................................ 307/10.6
See application file for complete search history.

(56) References Cited

U.S. PATENT DOCUMENTS

2016/0327007 A1    11/2016  Averbukh et al.
2018/0301919 A1    10/2018  Rumbaugh et al.
2020/0067333 A1*    2/2020  Wekwert ............. H02J 7/00714

FOREIGN PATENT DOCUMENTS

| CN | 207283184 U | 4/2018 |
| CN | 207388879 U | 5/2018 |
| CN | 109412225 A | 3/2019 |
| WO | 2013123943 A2 | 8/2013 |
| WO | 2018000130 A1 | 1/2018 |

OTHER PUBLICATIONS

Chinese Office Action issued in corresponding Chinese Application No. 201910182347.5, dated May 25, 2020, pp. 1-8, State Intellectual Property Office of P.R. of China, Beijing, China.

U.S. Office Action issued in corresponding U.S. Appl. No. 16/862,242, dated Apr. 21, 2021, pp. 1-15, United States Patent and Trademark Office.

\* cited by examiner

CHARGING DEVICE

CROSS-REFERENCE TO RELATED APPLICATION(S)

This application is a continuation of U.S. application Ser. No. 16/862,242, filed on Apr. 29, 2020, which claims the benefit of priority to Chinese Patent Application No. 201910182347.5, filed on Mar. 11, 2019, the disclosures of both of which are incorporated herein by reference in their entireties.

TECHNICAL FIELD

The present disclosure relates to the technical field of automotive power supply, and in particular, to a charging device.

BACKGROUND

As a starting power supply for automobiles, lead-acid batteries have always dominated the automotive field due to their advantages such as high and low temperature tolerance, high safety, high charge and discharge efficiency, low cost, and easy maintenance. However, after long-term use, lead-acid batteries will also experience problems such as aging, less charge and discharge cycles, and severe decay by high-current charge and discharge. As a result, the automobile cannot start normally due to insufficient power supply of lead-acid batteries. Therefore, an emergency starting power supply capable of starting the automobile in an emergency when the power supply from the internal battery is insufficient is widely welcomed by people.

Most of the automotive existing emergency starting power supplies use lead-acid batteries or lithium-ion batteries as energy storage units, so as to provide an emergency starting current to the automobile through the energy storage unit when the power supply of the internal battery of the automobile is insufficient.

However, once the existing emergency starting power supply is connected to the automotive battery, it will automatically output power to the battery, that is, it will automatically charge the battery. Thereby the power of the emergency starting power supply is wasted, decreasing the usage efficiency of the emergency starting power supply. In addition, if the automobile is not started in time, it is easy to run out of the power of the energy storage unit in the emergency starting power supply and can no longer to start the automobile.

SUMMARY

An embodiment of the disclosure discloses a charging device to solve the above problems.

An embodiment of the present disclosure discloses a charging device. The charging device includes an energy storage module, an output interface, a switch module, and a control module. The energy storage module is configured to store and provide electrical energy. The output interface is configured to be electrically coupled to a load, wherein the energy storage module is configured to output electrical energy to the load through a discharge circuit. The output interface is electrically coupled in the discharge circuit. The switch module is electrically coupled in the discharge circuit. The control module is configured to detect a current of the discharge circuit, and turn off the switch module when the current of the discharge circuit is greater than a preset current, to switch off an electrical connection between the energy storage module and the output interface.

BRIEF DESCRIPTION OF THE DRAWINGS

In order to illustrate the technical solutions in the embodiments of the present disclosure more clearly, the drawings used in the embodiments will be briefly introduced below. Obviously, the drawings in the following description are only some embodiments of the present disclosure. Those of ordinary skill in the art can obtain other drawings according to these drawings without creative efforts.

DETAILED DESCRIPTION

In the following, the technical solutions in the embodiments of the present disclosure will be clearly and completely described with reference to the drawings in the embodiments of the present disclosure. Obviously, the embodiments described are only a part of the embodiments of the present disclosure, but not all of them. Based on the embodiments of the present disclosure, all other embodiments obtained by a person of ordinary skill in the art without creative efforts shall fall within the protection scope of the present disclosure.

When an element is considered to be "coupled" or "connected" to another element, it can be directly connected to another element or intervening elements may also be present. Unless defined otherwise, all technical and scientific terms used herein have the same meaning as commonly understood by person of ordinary skill in the art to which this disclosure belongs. The terminology used herein in the description of the disclosure is for the purpose of describing particular embodiments only and is not intended to limit the disclosure.

According to an embodiment of the present disclosure, a charging device is provided. The charging device includes an energy storage module, an output interface, a switch module, and a control module. The energy storage module is configured to store and provide electrical energy. The output interface is configured to be electrically coupled to a load, wherein the energy storage module is configured to output electrical energy to the load through a discharge circuit. The output interface is electrically coupled in the discharge circuit. The switch module is electrically coupled in the discharge circuit. The control module is configured to detect a current of the discharge circuit, and turn off the switch module when the current of the discharge circuit is greater than a preset current, to switch off an electrical connection between the energy storage module and the output interface.

The above-mentioned "charging device" can be implemented in the form of an emergency starting power supply, and the above-mentioned "load" can be implemented in the form of an automobile battery. For the convenience of description, the technical scheme of the present disclosure is introduced in detail by taking the charging device as an emergency starting power source, and the load as an automobile battery as an example. Embodiments of the disclosure will be detailed below.

Figure 1:
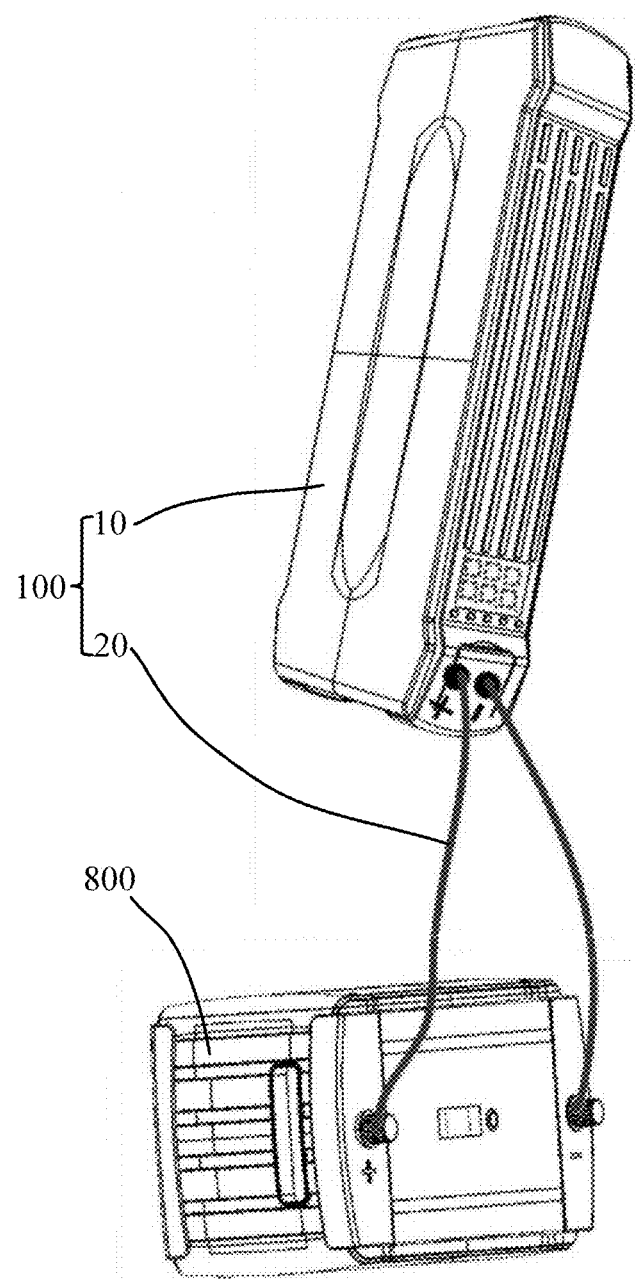
FIG. 1 is a schematic diagram of using an emergency starting power supply according to an embodiment of the present disclosure.

Please refer to FIG. 1, which is a schematic diagram of using an emergency starting power supply 100 according to an embodiment of the present disclosure. The emergency starting power supply 100 may be connected to an anode and a cathode of a battery (accumulator) 800 in an automobile. Because the automotive battery 800 is connected to an automobile engine, after the emergency starting power supply 100 is connected to the automotive battery 800, both of them can provide the starting current together to the automobile engine to start the automobile.

Figure 2:
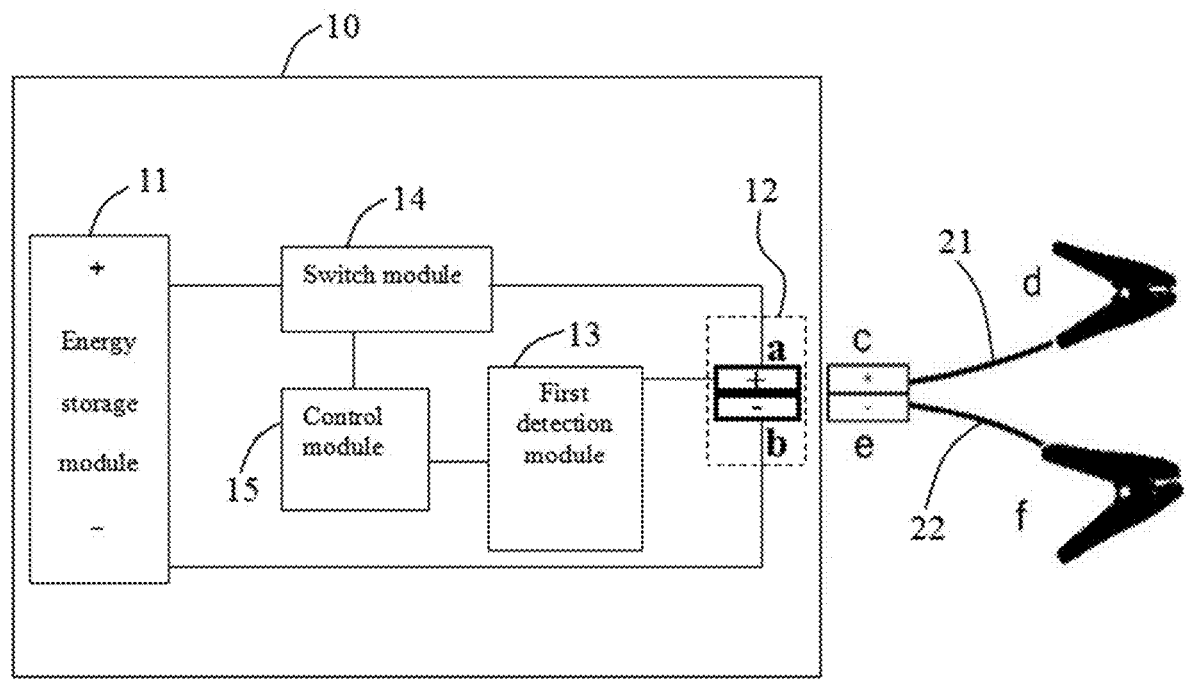
FIG. 2 is a principle block diagram of an emergency starting power supply according to another embodiment of the present disclosure.

Please refer to FIG. 2, which is a schematic block diagram of the emergency starting power supply 100 according to an embodiment of the present disclosure. As shown in FIG. 2, the emergency starting power supply 100 comprises a main body 10, wherein the main body 10 comprises an energy storage module 11, an output interface 12, a first detection module 13, a switch module 14, and a control module 15. The energy storage module 11 is used to store and provide electrical energy. The output interface 12 is electrically connected to the energy storage module 11, and is configured to be electrically coupled to the automobile battery 800. The energy storage module 11 is used to output an emergency starting current through the output interface 12 to start the automobile.

The first detection module 13 is electrically connected to the output interface 12, and when the output interface 12 is connected to the battery 800, the first detection module 13 detects the voltage of the battery 800 through the output interface 12.

The switch module 14 is electrically connected between the energy storage module 11 and the output interface 12, and is used to switch off or establish an electrical connection between the energy storage module 11 and the output interface 12. In this embodiment, the switch module 14 is in an off state by default.

The control module 15 is electrically connected to the first detection module 13 and the switch module 14, respectively. The control module 15 is used to determine whether the voltage drop of the battery 800 within the first preset duration is greater than a preset voltage drop according to the voltage detected by the first detection module 13, and turn on the switch module 14 to switch on the electrical connection between the energy storage module 11 and the output interface 12 when the voltage drop of the battery 800 within the first preset duration is greater than the preset voltage drop, so that the energy storage module 11 provides an emergency starting current to an automobile engine through the output interface 12 and the battery 800 to start the automobile in an emergency. Wherein, the emergency starting current provided by the emergency starting power supply 100 to the automobile engine is an instantaneous high current. For example, the instantaneous high current can be more than 1000 A, which can be set according to actual use conditions, and is not specifically limited herein.

It can be understood that according to different specific designs, the energy storage module 11 may include different numbers of multiple battery modules connected in series. For example, if the output voltage of the energy storage module 11 is required to be high, a larger number of battery modules may be connected in series. If the energy storage module 11 is required to output a lower voltage, a smaller number of battery modules may be connected in series. The specific number of battery modules is not limited herein.

Further, each battery module may include a single battery, or may be consist of multiple single batteries connected in parallel thereby increasing the output current of the energy storage module 11. In this embodiment, the single battery is preferably a lithium-ion battery that is light in weight, energy saving, and environmentally friendly.

In some embodiments, the control module 15 determines whether the emergency starting power supply 100 is electrically connected to the battery 800 according to the voltage detected by the first detection module 13. Specifically, since the switch module 14 is in an off state by default, when the voltage detected by the first detection module 13 is greater than a voltage threshold, it means that the battery 800 has been connected to the emergency starting power supply 100. If the voltage detected by the first detection module 13 is not greater than the voltage threshold, it means that the battery 800 is not connected to the emergency starting power supply 100. Wherein, the voltage threshold can be set to 0.5V. Of course, the voltage threshold can also be set according to specific conditions. In other embodiments, whether the emergency starting power supply 100 is electrically connected to the battery 800 may be determined according to other methods. For example, when the emergency starting power supply 100 and the battery 800 are electrically connected, a trigger signal is generated to the control module 15.

According to the emergency starting power supply 100 disclosed in the embodiment of the present disclosure, when the emergency starting power supply 100 is connected to the battery 800, the energy storage module 11 does not output electrical energy to the battery 800, which can prevent the emergency starting power supply 100 from automatically charging the battery 800. When a decrease in the voltage of the battery 800 is detected and the voltage drop within the first preset duration reaches the preset voltage drop, the switch module 14 is turned on to switch on the electrical connection between the energy storage module 11 and the output interface 12. At this time, the energy storage module 11 can provide electrical energy to the battery 800 to start the automobile in an emergency, thereby improving the usage efficiency of the emergency starting power supply 100.

It should be noted that when the automobile's start button is pressed or the key is in the "ON" state, it means that the automobile is about to start. At this time, the voltage of the battery 800 will decrease. Therefore, when the voltage drop of the battery 800 is detected, it can be determined that the automobile needs to be started. At this time, the switch module 14 is turned on to establish an electrical connection between the energy storage module 11 and the output interface 12, so that the energy storage module 11 can provide emergency starting current to the automobile to start the automobile. The emergency starting power supply 100 disclosed in the embodiment of the present disclosure outputs electrical energy only when the automobile is ignited. When the automobile is not ignited, although the emergency starting power supply 100 is connected to the battery 800, it does not output power. Therefore, even if the user electrically connects the emergency starting power supply 100 with the battery 800 but does not start the automobile in time, the electrical energy of the emergency starting power supply 100 will not be consumed, thereby improving the usage efficiency of the emergency starting power supply 100.

In some embodiments, the first preset duration may be 40 ms, and the preset voltage drop may be 0.1V. In other implementations, the preset duration and the preset voltage drop may be specifically determined according to a specific vehicle type and a battery type, and are not limited herein.

In some embodiments, in order to further improve the usage efficiency of the emergency starting power supply 100 and avoid the situation that the emergency starting power supply 100 still outputs power to the battery 800 after the automobile is started, when the switch module 14 is turned on, the control module 15 further determines whether a duration during which the switch module 14 is in an on state is greater than a second preset duration, and when the duration during which the switch module 14 is in the on state is greater than the second preset duration, the control module 15 turns off the switch module 14 to switch off the electrical connection between the energy storage module 11 and the output interface 12, so that the energy storage module 11 stops outputting electrical energy.

Wherein, since the starting time of an automobile is usually about 3 s, in order to ensure the starting time of the automobile, in a preferred embodiment, the second preset duration is 4-6 s.

Please refer to FIG. 1 and FIG. 2 together, in some embodiments, the emergency starting power supply 100 further includes a connection component 20. One end of the connection component 20 is detachably connected to the main body 10 through the output interface 12, and the other end of the connection component 20 is detachably connected to the battery 800.

Specifically, the output interface 12 includes a positive interface "a" and a negative interface "b". The connection component 20 includes a first connection line 21 and a second connection line 22. One end of the first connection line 21 is provided with a first positive connection terminal "c", and the other end of the first connection line 21 is provided with a second positive connection terminal "d". One end of the second connection line 22 is provided with a first negative connection terminal "e", and the other end of the second connection line 22 is provided with a second negative connection terminal "f". Wherein, the first positive connection terminal "c" can be electrically connected to the positive interface "a", the first negative connection terminal "e" can be electrically connected to the negative interface "b", the second positive connection terminal "d" can be electrically connected to the anode of the automotive battery 800, and the second negative connection terminal "f" can be electrically connected to the cathode of the automotive battery 800, so that the main body 10 of the emergency starting power supply 100 can be electrically connected to the automotive battery 800, and then the emergency starting power supply 100 and the automotive battery 800 can provide an emergency starting current to the automobile engine to start the automobile in an emergency.

Optionally, the second positive connection terminal "d" is a positive clip, and the second negative connection terminal "f" is a negative clip, so as to facilitate the connection of the connection component 20 to the automotive battery 800. However, the present disclosure does not limit the specific forms of the second positive connection end "d" and the second negative connection end "f".

Figure 3:
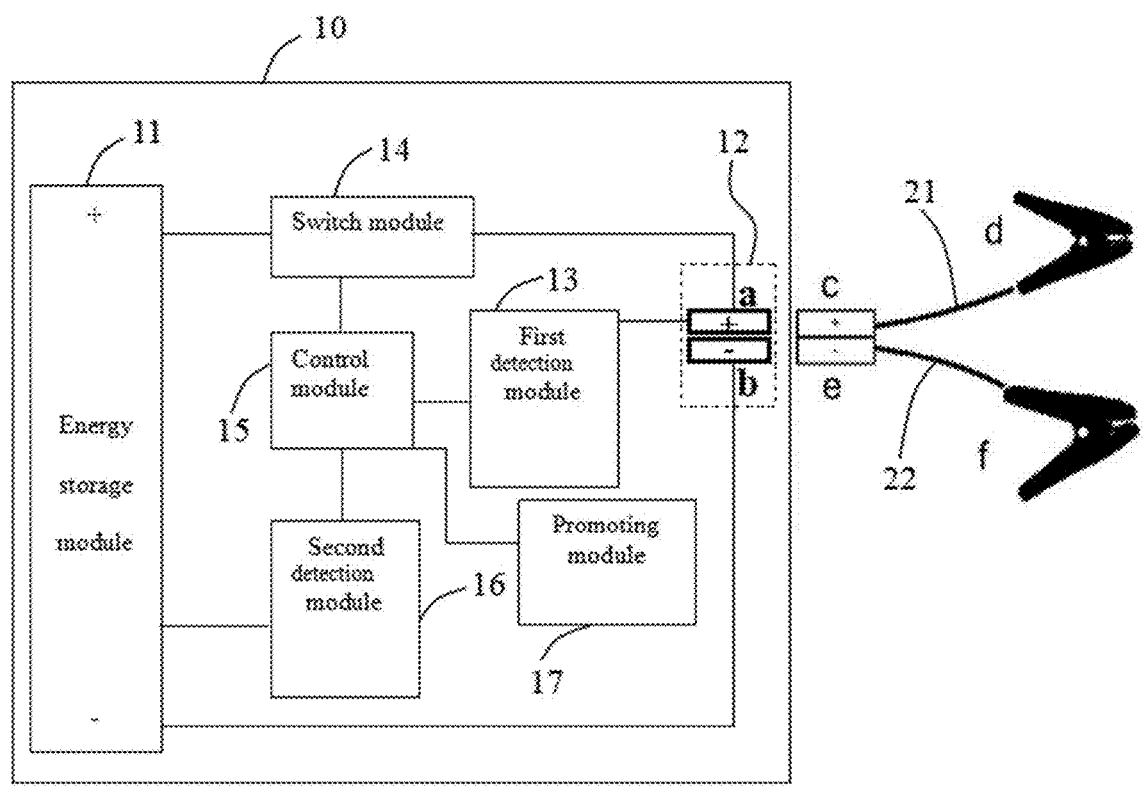
FIG. 3 is a principle block diagram of an emergency starting power supply according to another embodiment of the present disclosure.

Please refer to FIG. 3. In some embodiments, the main body 10 further includes a second detection module 16. The second detection module 16 is electrically connected to the energy storage module 11 and the control module 15 respectively, and is used to detect the voltage of the energy storage module 11. The control module 15 is further used to determine whether the voltage of the energy storage module 11 is greater than the voltage of the battery 800 based on the voltages detected by the first detection module 13 and the second detection module 16 when the output interface 12 is connected to the battery 800 of the automobile. When the voltage of the energy storage module 11 is greater than the voltage of the battery 800 and the voltage drop of the battery during the first preset duration is greater than a preset voltage drop, the control module 15 turns on the switch module 14, so that the emergency starting power supply 100 can start the automobile normally.

In some embodiments, the main body 10 further includes a prompt module 17. The prompt module 17 is electrically connected to the control module 15. When the control module 15 determines that the voltage of the energy storage module 11 is not greater than the voltage of the battery 800, the control module 15 controls the prompt module 17 to issue prompt information to prompt the user that the emergency starting power supply 100 cannot start the automobile and prevent the battery 800 from charging the emergency starting power supply 100. Wherein, the prompt module 17 may be a light emitting diode, a buzzer, or the like.

Wherein, the control module 15 may be a single-chip microcomputer, a microcontroller (Micro Control Unit, MCU), or the like. The control module 15 may include multiple signal acquisition pins, control pins, and the like. Among them, the control module 15 may further electrically connected to the first detection module 13 and the second detection module 16 by its multiple signal acquisition pins, so as to obtain the voltages of the battery 800 and the energy storage module 11. The control module 15 can also be electrically connected to the switch module 14 and the prompt module 17 by its control pins to control the corresponding modules accordingly.

Figure 4:
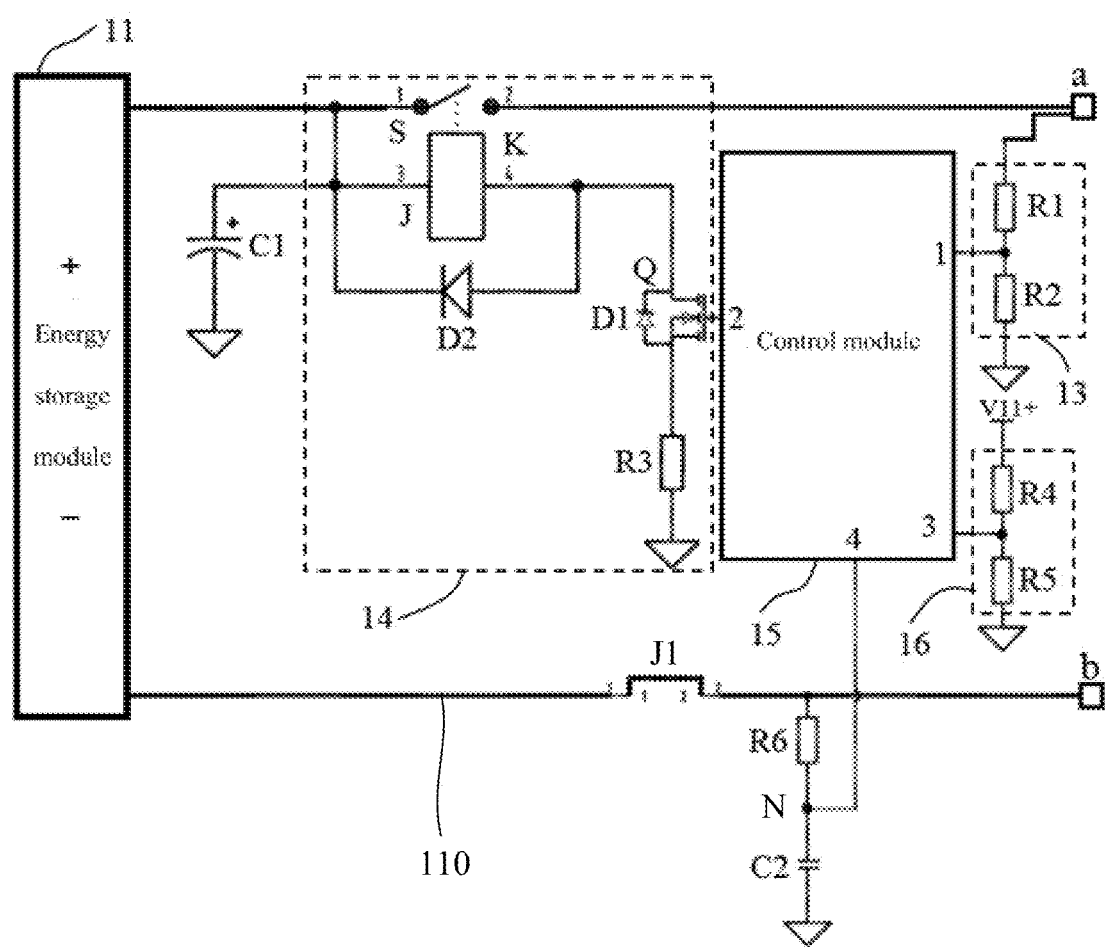
FIG. 4 is a circuit schematic diagram of an emergency starting power supply according to an embodiment of the present disclosure.

Please refer to FIG. 4, which is a schematic circuit diagram of an emergency starting power supply 100 according to an embodiment of the present disclosure. As shown in FIG. 4, the first detection module 13 includes a first resistor R1 and a second resistor R2. The first connection end of the first resistor R1 is electrically connected to the positive interface "a", and can further be electrically connected to the anode of the battery 800 via the positive interface "a". The second connection end of the first resistor R1 is grounded via the second resistor R2. The first detection pin "1" of the control module 15 is connected to a connection node between the first resistor R1 and the second resistor R2.

When the main body 10 of the emergency starting power supply 100 is not connected to the battery 800, the divided voltage across the second resistor R2 is 0. When the main body 10 of the emergency starting power supply 100 is connected to the battery 800 via the connection component 20, the positive interface "a" is electrically connected to the anode of the battery 800, and the negative interface "b" is electrically connected to the cathode of the battery 800. At this time, the control module 15 can acquire the voltage of the battery 800 by collecting the divided voltage across the second resistor R2. Therefore, when the control module 15 detects that the divided voltage across the second resistor R2 is greater than a voltage threshold, it can be determined that the emergency starting power supply 100 and the battery 800 are connected.

The switch module 14 includes a relay K and an electronic switch Q. The relay K is electrically connected between the energy storage module 11 and the output interface 12, and the electronic switch Q is electrically connected between the relay K and the control module 11. The control module 15 controls an on-off state of the relay K by controlling an on-off state of the electronic switch Q, thereby controlling the state of the electrical connection between the energy storage module 11 and the output interface 12.

In some embodiments, a first connection terminal "1" of the relay K is electrically connected to an anode/a positive connection terminal "+" of the energy storage module 11, a second connection terminal "2" of the relay K is electrically connected to the positive interface "a", a third connection terminal "3" of the relay K is connected to the anode/a positive connection terminal "+" of the energy storage module 11; and a fourth connection terminal "4" of the relay K is electrically connected to the first connection end of the electronic switch Q. The control end of the electronic switch Q is connected to the control pin 2 of the control module 15 is connected, and the second connection end of the electronic switch Q is grounded.

In some embodiments, the relay K includes a coil J and a single-pole single-throw switch S, and the first connection terminal "1" and the second connection terminal "2" of the relay K correspond to a static contact and a moving contact of the single-pole single-throw switch S, respectively. The third connection terminal "3" and the fourth connection terminal "4" of the relay K correspond to two ends of the coil J, respectively.

In some embodiments, the electronic switch Q includes an N-type MOS FET (Metal Oxide Semiconductor Field Effect Transistor), and the first connection terminal, the second connection terminal, and the control terminal of the electronic switch Q correspond to the drain, source and gate of the N-type MOS field effect transistor, respectively. Further, the electronic switch Q further includes a first diode D1, an anode of the first diode D1 is connected to the source of the MOS FET, and a cathode of the first diode D1 is connected to the drain of the MOS FET. Wherein, the first diode D1 may be a parasitic diode or a built-in diode of the MOS field effect transistor.

In addition, the switch module 14 further includes an electrolytic capacitor C1 and a second diode D2 to protect the relay K. Specifically, the third connection end of the relay K is also connected to the anode of the electrolytic capacitor C1, and the cathode of the electrolytic capacitor C1 is grounded. An anode of the second diode D2 is connected to the fourth connection terminal "4" of the relay K, and a cathode of the second diode D2 is connected to a third connection terminal "3" of the relay K, thereby forming a discharge coil provide a circuit for the relay K when power off.

In addition, the switch module 14 may further include a third resistor R3, and the second connection terminal of the electronic switch Q is grounded through the third resistor R3.

When the main body 10 of the emergency starting power supply 100 is not connected to the battery 800, the control module 15 outputs a first level signal (a low level signal in this embodiment) to switch off the MOS FET Q, so that the coil J of the relay K is powered off, thereby the single-pole single-throw switch S is switched off, causing the energy storage module 11 stop outputting electrical energy to the battery 800.

When the main body 10 of the emergency starting power supply 100 is connected to the battery 800, the control module 15 detects the voltage of the battery 800 by the first detection module 13. When it is detected that the divided voltage across the second resistor R2 decreases, and the voltage drop within the preset duration is greater than the preset voltage drop, it is determined that the automobile is in the ignition state. At this time, the control module 15 outputs, through its control pin "2", a second level signal (a high level signal in this embodiment) to switch on the MOS FET Q, so that the coil J of the relay K is powered on, thereby the single-pole single-throw switch S is turned on, enabling the energy storage module 11 to output electrical energy to the battery 800 to provide emergency starting current for starting the automobile.

After the switch module 14 is turned on, the control module 15 further determines whether the duration during which the switch module 14 is in an on state is greater than a second preset duration. When the duration during which the switch module 14 is in the on state is greater than the second preset duration, the first level signal is output to switch off the MOS FET, so that the coil J of the relay K is powered off, and the single-pole single-throw switch S is switched off, which causes that the energy storage module 11 cannot output electrical energy, thereby the emergency starting power supply 100 can be prevented from outputting electrical energy to the battery 800 when it is connected to the battery 800.

The second detection module 16 includes a fourth resistor R4 and a fifth resistor R5. A first connection terminal of the fourth resistor R4 is electrically connected to the anode/positive connection terminal "+" of the energy storage module 11, and a second connection terminal of the fourth resistor R4 is grounded through the fifth resistor R5. The second detection pin "3" of the control module 15 is connected to a connection node between the fourth resistor R4 and the fifth resistor R5.

Similarly, the control module 15 can also learn the voltage of the energy storage module 11 by detecting the divided voltage across the fifth resistor R5. When the main body 10 of the emergency starting power supply 100 is connected to the battery 800, the control module 15 determines whether the voltage of the energy storage module 11 is greater than the voltage of the battery 800, and when the voltage across the fifth resistor R5 is greater than the voltage of the battery 800, the control module 15 determines whether the voltage of the energy storage module 11 is greater than the voltage of the battery 800.

In addition, in some embodiments, the control module 15 further includes a third detection pin "4", and detects a power supply current of the energy storage module 11 through the third detection pin "4". When the power supply current of the energy storage module 11 is greater than a preset current, the control module 15 turns off the switch module 14 to protect the energy storage module 11.

Specifically, as shown in FIG. 4, the energy storage module 11 is configured to output electrical energy to the automotive battery 800 through a discharge circuit 110, to provide the emergency starting current for starting the automobile. It can be understood that, the current of the discharge circuit is the power supply current/output current of the energy storage module 11.

The switch module 14 and the output interface 12 are electrically coupled in the discharge circuit 110, respectively. In the embodiment, the switch module 14 is electrically coupled between a positive connection terminal "+" of the energy storage module 11 and the positive interface "a" of the output interface 12.

In the embodiment, the emergency starting power supply 10 further includes a current sampling element J1 electrically coupled in series in the discharge circuit 110. The current sampling element J1 includes a first connection terminal "1" coupled to a negative connection terminal "−" of the energy storage module 11, and a second connection terminal "2" coupled to the negative interface "b" of the output interface 12.

The third detection pin "4" of the control module 15 is coupled to the second connection terminal "2" of the current sampling element J1 through a sixth resistor R6. The second connection terminal "2" of the current sampling element J1 is further grounded through the sixth resistor R6 and a capacitor C2.

It can be understood that, the voltage of a node N between the sixth resistor R6 and the capacitor C2 is equal to the voltage of the second connection terminal "2" of the current sampling element J1.

In the embodiment, the current sampling element J1 is a sampling resistor. The control module 15 is configured to detect a voltage of the second connection terminal "2" of the current sampling element J1, and determine the current of the discharge circuit 110 based on the voltage of the second connection terminal "2" of the current sampling element J1 and a resistance value of the current sampling element J1.

In this way, the control module 15 can determine whether the power supply current/output current of the energy storage module 11 is greater than a preset current by detecting the voltage of the node N between the sixth resistor R6 and the capacitor C2. When the voltage of the node N is greater than the preset voltage, it is determined that the output current of the energy storage module 11 is greater than the preset current.

Figure 5:
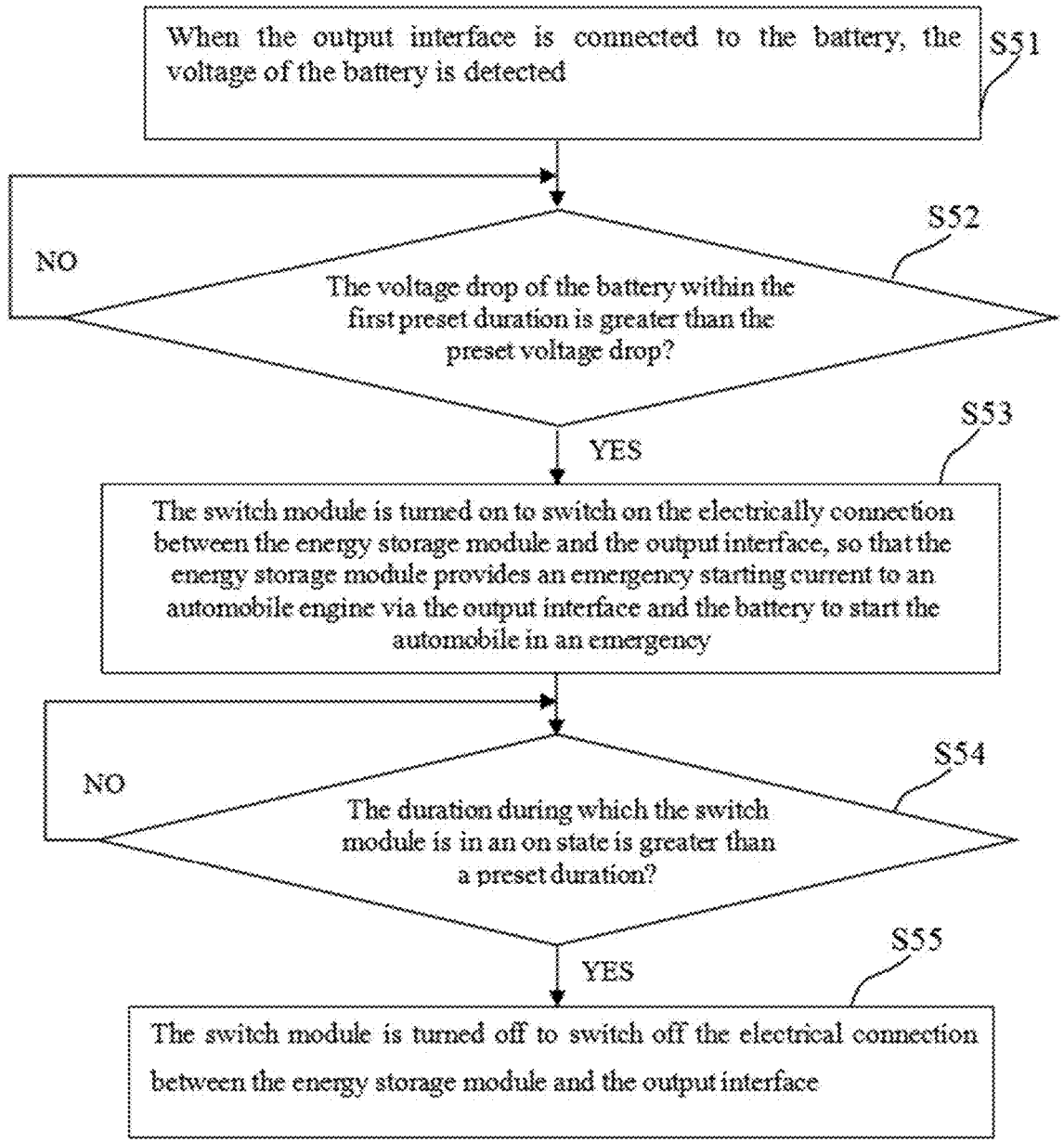
FIG. 5 is a flowchart of steps of an emergency starting method according to an embodiment of the present disclosure.

Please refer to FIG. 5 again, an embodiment of the present disclosure further provides an emergency starting method, which is applied in the emergency starting power supply 100 described above. The emergency starting method comprises the following steps.

In step S51, when the output interface 12 is connected to the battery 800, the voltage of the battery 800 is detected.

In step S52, it is determined whether the voltage drop of the battery 800 within the first preset duration is greater than the preset voltage drop; if YES, step S53 is performed; if NO, the process returns to step S52.

In step S53, the switch module 14 is turned on to switch on the electrically connection between the energy storage module 11 and the output interface 12, so that the energy storage module 11 provides an emergency starting current to an automobile engine via the output interface 12 and the battery 800 to start the automobile in an emergency. In step S54, it is determined whether the duration during which the switch module 14 is in an on state is greater than a preset duration; if YES, step S55 is performed; if NO, the process returns to step S54.

In step S55, the switch module 14 is turned off to switch off the electrical connection between the energy storage module 11 and the output interface 12.

Figure 6:
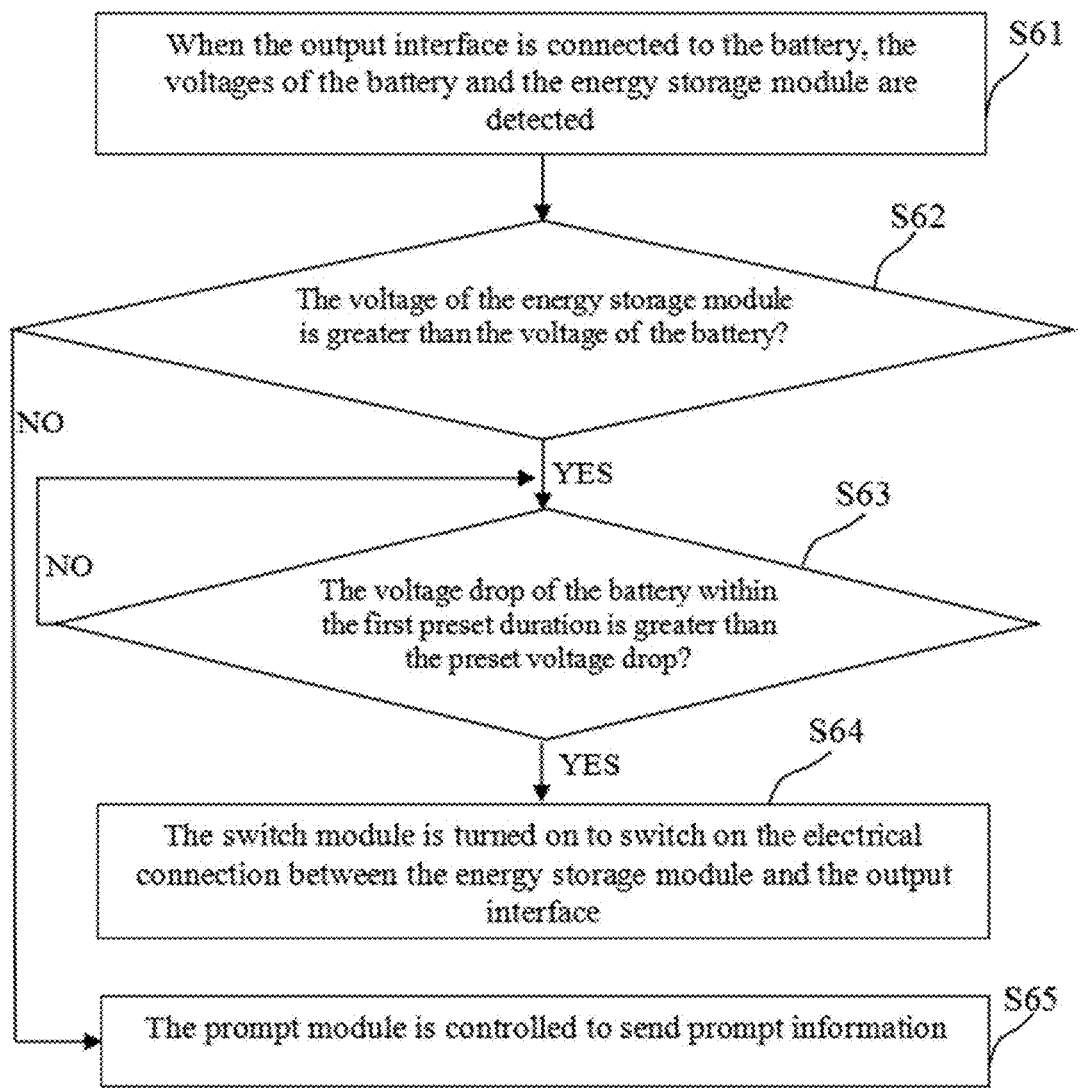
FIG. 6 is a flowchart of steps of an emergency starting method according to another embodiment of the present disclosure.

Please refer to FIG. 6 again, which is a flowchart of an emergency starting method according to another embodiment of the present application. The emergency starting method is used in the emergency starting power supply 100 described above. The emergency starting method comprises the following steps.

In step S61, when the output interface is connected to the battery, the voltages of the battery and the energy storage module 11 are detected.

In step S62, it is determined whether the voltage of the energy storage module 11 is greater than the voltage of the battery 800 according to the detected voltages of the energy storage module 11 and the voltage of the battery 800; if YES, step S63 is performed; if NO, step S65 is performed.

In step S63, it is determined whether the voltage drop of the battery 800 within the first preset duration is greater than the preset voltage drop; if YES, step S64 is performed; if NO, the process returns to step S63.

Wherein, step S63 is the same as step S52, and details are not described herein again.

In step S64, the switch module 14 is turned on to establish an electrical connection between the energy storage module 11 and the output interface 12.

Wherein, step S64 is the same as step S53, and details are not described herein again.

In step S65, the prompt module 17 is controlled to issue prompt information.

It should be noted that each of the foregoing embodiments of the methods has been described as a combination of a series of actions for brevity, but persons skilled in the art should understand that the present disclosure is limited to the sequence in which the actions are performed, because some of the actions can be performed in a different sequence or simultaneously according to the present disclosure. Furthermore, persons skilled in the art should also understand that the implementations described in the present disclosure are all preferable ones, while the actions and the units described herein are not necessary for the present disclosure.

In the above embodiments, the description of each embodiment has its own emphasis. For a part that is not described in detail in an embodiment, reference may be made to related descriptions in other embodiments. For the aforementioned embodiments, the description for each embodiment has its own emphasis, and what is not described in detail in one certain implementation may be known with reference to relevant description for other implementations.

The steps in the methods according to the embodiment s of the present disclosure may be merged or removed, and their sequence may be adjusted, according to actual requirements.

The interactive method provided in this disclosure can be implemented in hardware or firmware, or can be used as software or computer code that can be stored in a readable storage medium such as CD, ROM, RAM, floppy disk, hard disk, or magneto-optical disk, or it can be used as the computer code originally stored on a remote recording medium or non-transitory machine-readable medium, downloaded over a network, and stored in a local recording medium, so that the methods described herein can utilize a general purpose computer or special processor or be in a programmable or dedicated hardware such as ASIC or FPGA to be embodied in the form of software stored on a recording medium. As can be understood in the art, a computer, processor, microprocessor, controller, or programmable hardware includes a memory component, such as RAM, ROM, flash memory, etc. When a computer, processor, or hardware implements the processing method described herein to access and execute software or computer code, a memory component may store or receive software or computer code. In addition, when a general-purpose computer accesses code for implementing the processing shown here, execution of the code converts the general-purpose computer into a special-purpose computer for performing the processing shown here.

The foregoing is the typical embodiments of the present disclosure. It should be noted that, several improvements and modifications can be made by persons skilled in the art without departing from the principles of the present disclosure, and these improvements and modifications also fall within the protection scope of the present disclosure.

Wherein, the readable storage medium may be a solid-state memory, a memory card, an optical disc, or the like. The readable storage medium stores program instructions for a computer to call and executes the foregoing interaction method.

It should be noted that the above embodiments are merely intended for describing the technical solutions of the present disclosure other than limiting the present disclosure. It also should be noted that, for those of ordinary skill in the art, they can still make modifications, improvements, or retouches to the technical solutions described in the foregoing embodiments, or make equivalent substitutions to part of or all the technical features thereof. These modifications, improvements, retouches, or substitutions shall be within the protection scope of the present disclosure.

What is claimed is:

1. A charging device, comprising:
   an energy storage module configured to store and provide electrical energy;
   a discharge circuit;
   an output interface electrically coupled in the discharge circuit, wherein the discharge circuit is configured to be electrically coupled to a load through the output interface; the energy storage module is configured to output electrical energy to the load through the discharge circuit, to provide emergency starting current for starting an automobile;
   a switch module electrically coupled in the discharge circuit; and
   a control module configured to detect a current of the discharge circuit, and turn off the switch module when the current of the discharge circuit is greater than a preset current, to switch off an electrical connection between the energy storage module and the output interface;
   wherein the control module is further configured to determine whether a voltage drop of the load within a first preset duration is greater than a preset voltage drop, and turn on the switch module when the voltage drop of the load within the first preset duration is greater than the preset voltage drop, and
   wherein after the switch module is turned on, the control module is further configured to determine whether a duration during which the switch module is in the on state is greater than a second preset duration, and turn off the switch module to switch off the electrical connection between the energy storage module and the output interface when the duration during which the switch module is in the on state is greater than the second preset duration.

2. The charging device of claim 1, wherein the switch module is electrically coupled between a positive connection terminal of the energy storage module and a positive interface of the output interface.

3. The charging device of claim 1, further comprising a current sampling element electrically coupled in series in the discharge circuit, wherein the current sampling element comprises a first connection terminal coupled to a negative connection terminal of the energy storage module and a second connection terminal coupled to a negative interface of the output interface;
   wherein the control module is coupled to the second connection terminal of the current sampling element, and the control module is configured to detect a voltage of the second connection terminal, and determine the current of the discharge circuit based on the voltage of the second connection terminal and a resistance value of the current sampling element.

4. The charging device of claim 3, wherein the current sampling element is a sampling resistor.

5. The charging device of claim 1, further comprising a first detection module electrically coupled to the output interface and the control module respectively, wherein the first detection module is configured to detect a voltage of the load through the output interface when the load is coupled to the output interface, and send the detected voltage of the load to the control module;
   the control module is configured to receive the voltage of the load detected by the first detection module, and determine whether the voltage drop of the load within the first preset duration is greater than a preset voltage drop based on the voltage of the load detected by the first detection module.

6. The charging device of claim 1, wherein the second preset duration is 4-6 s.

7. The charging device of claim 1, further comprising:
   a first detection module electrically coupled to the output interface and the control module respectively, wherein the first detection module is configured to detect a voltage of the load through the output interface when the load is coupled to the output interface, and send the detected voltage of the load to the control module; and
   a second detection module electrically coupled to the energy storage module and the control module respectively, wherein the second detection module is configured to detect a voltage of the energy storage module, and send the detected voltage of the energy storage module to the control module;
   the control module is configured to receive the voltage of the load and the voltage of the energy storage module, and determine whether the voltage of the energy storage module is greater than the voltage of the load based on the voltages of the load and the energy storage module, as well as determine whether the voltage drop of the load within the first preset duration is greater than a preset voltage drop based on the voltage of the load;
   the control module is further configured to turn on the switch module when the voltage of the energy storage module is greater than the voltage of the load and the voltage drop of the load within the first preset duration is greater than the preset voltage drop.

8. The charging device of claim 7, further comprising a prompt module electrically coupled to the control module;
   wherein the control module is further configured to control the prompt module to issue prompt information when the voltage of the energy storage module is not greater than the voltage of the load.

9. A charging device, comprising:
   an energy storage module configured to store and provide electrical energy;
   a discharge circuit;
   an output interface electrically coupled in the discharge circuit, wherein the discharge circuit is configured to be electrically coupled to a load through the output interface; the energy storage module is configured to output electrical energy to the load through the discharge circuit, to provide emergency starting current for starting an automobile;
   a switch module electrically coupled in the discharge circuit; and a control module configured to determine whether a voltage drop of the load within a first preset duration is greater than a preset voltage drop, and turn on the switch module when the voltage drop of the load within the first preset duration is greater than the preset voltage drop;

wherein after the switch module is turned on, the control module is further configured to determine whether a duration during which the switch module is in the on state is greater than a second preset duration, and turn off the switch module to switch off an electrical connection between the energy storage module and the output interface when the duration during which the switch module is in the on state is greater than the second preset duration.

10. The charging device of claim 9, wherein the switch module is electrically coupled between a positive connection terminal of the energy storage module and a positive interface of the output interface.

11. The charging device of claim 9, wherein the control module is further configured to detect a current of the discharge circuit, and turn off the switch module when the current of the discharge circuit is greater than a preset current, to switch off the electrical connection between the energy storage module and the output interface.

12. The charging device of claim 11, further comprising a current sampling element electrically coupled in series in the discharge circuit, wherein the current sampling element comprises a first connection terminal coupled to a negative connection terminal of the energy storage module and a second connection terminal coupled to a negative interface of the output interface;

wherein the control module is coupled to the second connection terminal of the current sampling element, and the control module is configured to detect a voltage of the second connection terminal, and determine the current of the discharge circuit based on the voltage of the second connection terminal and a resistance value of the current sampling element.

13. The charging device of claim 9, further comprising a first detection module electrically coupled to the output interface and the control module respectively, wherein the first detection module is configured to detect a voltage of the load through the output interface when the load is coupled to the output interface, and send the detected voltage of the load to the control module;

the control module is configured to receive the voltage of the load detected by the first detection module, and determine whether the voltage drop of the load within the first preset duration is greater than a preset voltage drop based on the voltage of the load detected by the first detection module.

14. The charging device of claim 9, wherein the second preset duration is 4-6 s.

15. A charging device, comprising:
an energy storage module configured to store and provide electrical energy;
a discharge circuit;
an output interface electrically coupled in the discharge circuit, wherein the discharge circuit is configured to be electrically coupled to a load through the output interface; the energy storage module is configured to output electrical energy to the load through the discharge circuit, to provide emergency starting current for starting an automobile;
a switch module electrically coupled in the discharge circuit; and a control module configured to determine whether a voltage of the energy storage module is greater than a voltage of the load, as well as determine whether a voltage drop of the load within a first preset duration is greater than a preset voltage drop, and turn on the switch module when the voltage of the energy storage module is greater than the voltage of the load and the voltage drop of the load within the first preset duration is greater than the preset voltage drop;

wherein after the switch module is turned on, the control module is further configured to determine whether a duration during which the switch module is in the on state is greater than a second preset duration, and turn off the switch module to switch off an electrical connection between the energy storage module and the output interface when the duration during which the switch module is in the on state is greater than the second preset duration.

16. The charging device of claim 15, wherein the control module is further configured to detect a current of the discharge circuit, and turn off the switch module when the current of the discharge circuit is greater than a preset current, to switch off the electrical connection between the energy storage module and the output interface.

17. The charging device of claim 16, further comprising a current sampling element electrically coupled in series in the discharge circuit, wherein the current sampling element comprises a first connection terminal coupled to a negative connection terminal of the energy storage module and a second connection terminal coupled to a negative interface of the output interface;

wherein the control module is coupled to the second connection terminal of the current sampling element, and the control module is configured to detect a voltage of the second connection terminal, and determine the current of the discharge circuit based on the voltage of the second connection terminal and a resistance value of the current sampling element.

18. The charging device of claim 15, further comprising:
a first detection module electrically coupled to the output interface and the control module respectively, wherein the first detection module is configured to detect the voltage of the load through the output interface when the load is coupled to the output interface, and send the detected voltage of the load to the control module; and
a second detection module electrically coupled to the energy storage module and the control module respectively, wherein the second detection module is configured to detect the voltage of the energy storage module, and send the detected voltage of the energy storage module to the control module;

the control module is configured to receive the voltage of the load and the voltage of the energy storage module, and determine whether the voltage of the energy storage module is greater than the voltage of the load based on the voltages of the load and the energy storage module, as well as determine whether the voltage drop of the load within the first preset duration is greater than a preset voltage drop based on the voltage of the load;

the control module is further configured to turn on the switch module when the voltage of the energy storage module is greater than the voltage of the load and the voltage drop of the load within the first preset duration is greater than the preset voltage drop.

19. The charging device of claim 18, wherein the second preset duration is 4-6 s.

20. The charging device of claim 18, further comprising a prompt module electrically coupled to the control module; wherein the control module is further configured to control the prompt module to issue prompt information when the voltage of the energy storage module is not greater than the voltage of the load.

\* \* \* \* \*